(12) United States Patent
Singh et al.

(10) Patent No.: US 12,231,728 B2
(45) Date of Patent: Feb. 18, 2025

(54) SYSTEMS AND METHODS FOR PROTECTING PRIVACY ASSOCIATED WITH UTILIZED CONTENT

(71) Applicant: Verizon Patent and Licensing Inc., Basking Ridge, NJ (US)

(72) Inventors: Satish K. Singh, Chennai (IN); Sankaran Raman, Chennai (IN); Jagadeesh Narasimhan, Chennai (IN); Venkatesan M. Sriraman, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 164 days.

(21) Appl. No.: 18/054,713

(22) Filed: Nov. 11, 2022

(65) Prior Publication Data

US 2024/0163512 A1    May 16, 2024

(51) Int. Cl.
*H04N 21/454* (2011.01)
*H04N 21/25* (2011.01)

(52) U.S. Cl.
CPC .......... *H04N 21/454* (2013.01); *H04N 21/25* (2013.01)

(58) Field of Classification Search
CPC .. H04N 21/454; H04N 21/25; H04N 21/4532; H04N 21/25891; H04N 21/4826; H04N 21/4668; H04N 21/47202
USPC ........................................................ 725/25
See application file for complete search history.

(56) References Cited

U.S. PATENT DOCUMENTS

| | | | |
|---|---|---|---|
| 2009/0138805 A1* | 5/2009 | Hildreth | H04N 21/4755 715/745 |
| 2011/0300852 A1* | 12/2011 | Krishnaswamy | A61B 5/374 455/422.1 |
| 2013/0218905 A1* | 8/2013 | Sankarasubramaniam | G06F 16/435 707/755 |
| 2015/0100977 A1* | 4/2015 | Shieh | H04N 21/47217 725/28 |
| 2015/0281782 A1* | 10/2015 | Wang | H04N 21/23 725/9 |
| 2016/0044385 A1* | 2/2016 | Kareeson | G06Q 20/1235 725/27 |
| 2016/0066040 A1* | 3/2016 | Webster | H04N 21/44222 725/34 |
| 2018/0063857 A1* | 3/2018 | Caplan | H04N 21/25866 |
| 2018/0227304 A1* | 8/2018 | Cha | H04L 63/108 |
| 2020/0133631 A1* | 4/2020 | Christie | H04N 21/47202 |

* cited by examiner

*Primary Examiner* — Cynthia M Fogg

(57) ABSTRACT

A device may receive, from a first user device, a first user device identifier and first privacy settings limiting content to only the first user device, and may receive, from a second user device, second privacy settings limiting content to only the second user device during a particular time period. The device may receive, from a third user device, third privacy settings not limiting content, and may receive, from the first user device, a first request for first content. The device may provide, to the first user device, all or a portion of the first content, and may generate first information that includes a first content recommendation based on the first content and/or a first indication of the portion of the first content. The device may provide the first information only to the first user device based on the first privacy settings and the first user device identifier.

20 Claims, 12 Drawing Sheets

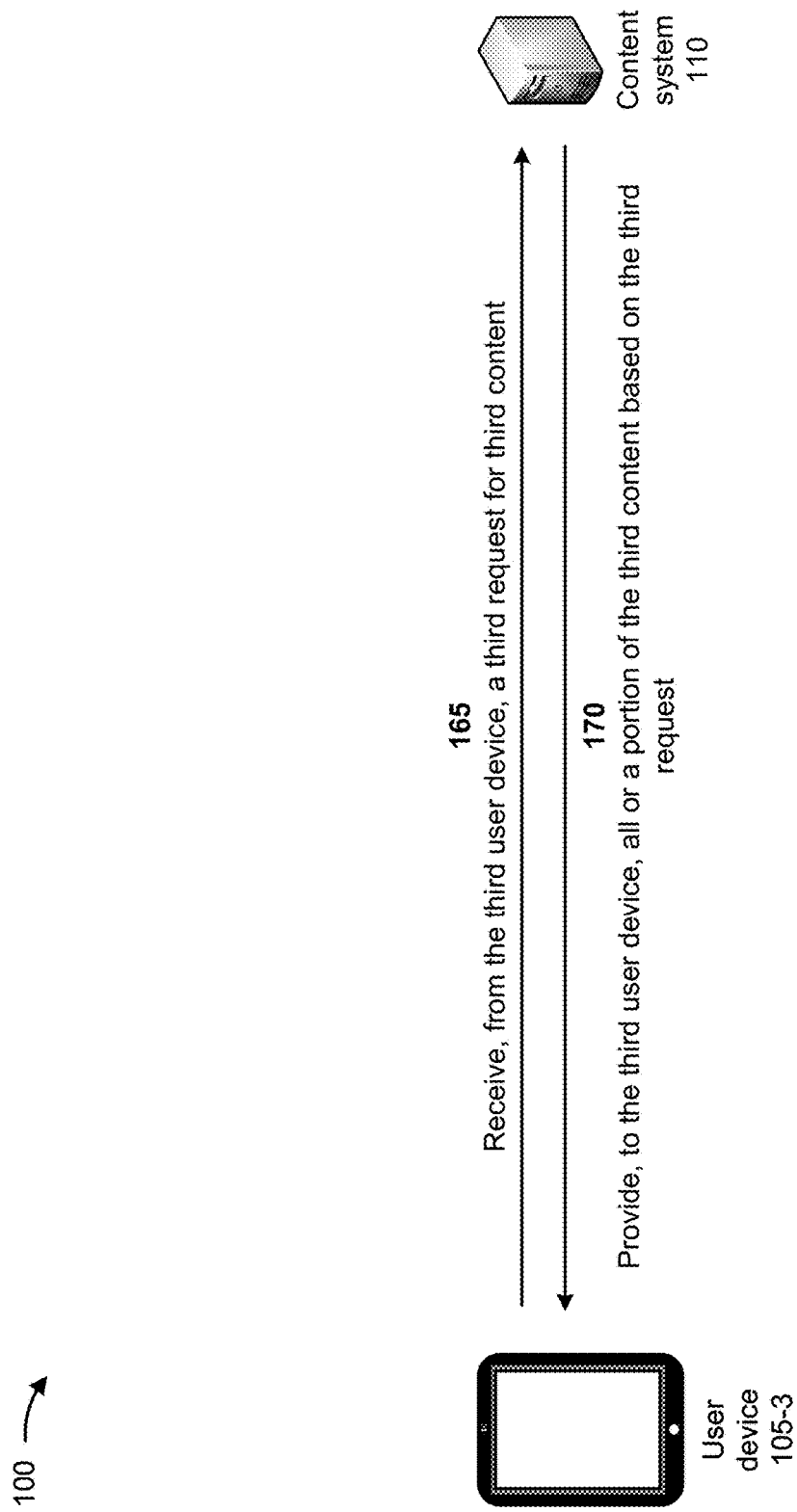

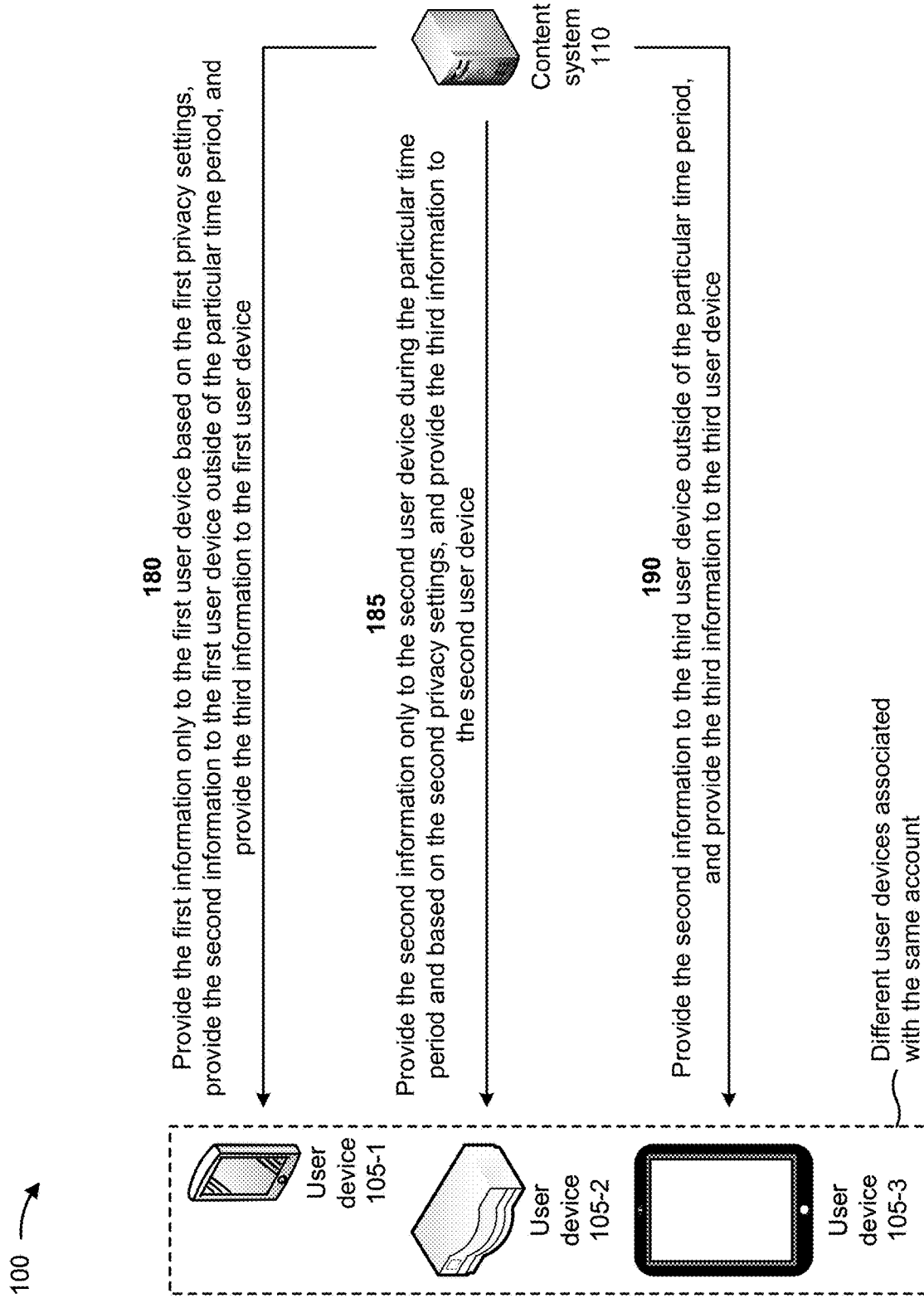

SYSTEMS AND METHODS FOR PROTECTING PRIVACY ASSOCIATED WITH UTILIZED CONTENT

BACKGROUND

Content (e.g., movies, television shows, audio recordings, and/or the like) may be provided to multiple user devices associated with an account. For example, an account user may view content via a television and/or a set-top box, a laptop computer, a smartphone, a tablet computer, and/or the like.

BRIEF DESCRIPTION OF THE DRAWINGS

FIGS. 1A-1I are diagrams of an example associated with protecting privacy associated with utilized content.

DETAILED DESCRIPTION OF EXAMPLE EMBODIMENTS

Figure 1A:
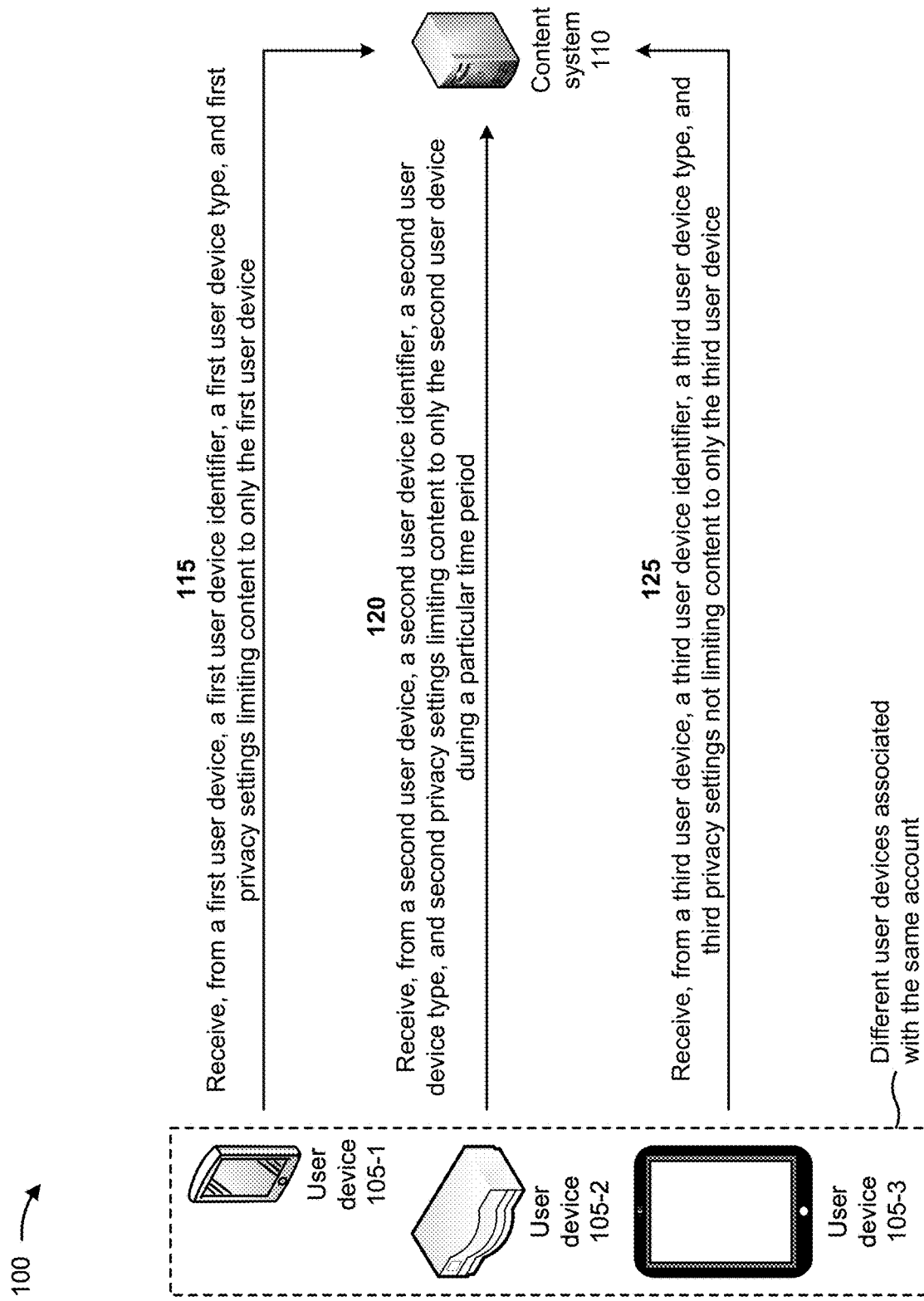

The following detailed description of example implementations refers to the accompanying drawings. The same reference numbers in different drawings may identify the same or similar elements.

Content providers today are focused on providing content to users at all access points (e.g., user devices) seamlessly for easy content consumption. While this improves content availability, providing content to all access points may pose a risk to individual privacy of a user. For example, if a user viewed content not appropriate for children on a smartphone, information identifying the inappropriate content, or the inappropriate content itself, may be provided to a set-top box being utilized by children or guests. This may cause embarrassment for the user with family members or with guests. Currently, content providers attempt to address this privacy concern by providing separate user profiles. However, user profiles require user selection and excessive user intervention and can be selected by other users, rendering the process unintuitive and limited. Thus, current techniques for addressing privacy concerns with utilized content consume computing resources (e.g., processing resources, memory resources, communication resources, and/or the like), networking resources, and/or other resources associated with managing user profiles with user devices, failing to secure privacy of a user with a user profile, being unable to manage a user profile due to non-intuitive mechanisms for managing the user profile, and/or the like.

Some implementations described herein provide a content system that protects privacy associated with utilized content. For example, the content system may receive, from a first user device, a first user device identifier and first privacy settings limiting content to only the first user device, and may receive, from a second user device, a second user device identifier and second privacy settings limiting content to only the second user device during a particular time period. The content system may receive, from a third user device, a third user device identifier and third privacy settings not limiting content to only the third user device, and may receive, from the first user device, a first request for first content. The content system may provide, to the first user device, all or a portion of the first content based on the first request, and may generate first information that includes a first content recommendation based on the first content and/or a first indication of the portion of the first content received by the first user device. The content system may provide the first information only to the first user device based on the first privacy settings and the first user device identifier, and may receive, from the second user device, a second request for second content. The content system may provide, to the second user device, all or a portion of the second content based on the second request, and may generate second information that includes a second content recommendation based on the second content and/or a second indication of the portion of the second content received by the second user device. The content system may provide the second information only to the second user device during the particular time period and based on the second privacy settings and the second user device identifier.

In this way, the content system protects the privacy of users. For example, the content system may address privacy concerns of users without affecting the ease of content availability and overall user experience. The content system may protect privacy associated with utilized content by evaluating privacy settings based on a time period of content usage, a user device utilized to consume the content, and a type of content utilized. Depending on a user device type, a user may set initial privacy settings for the user device, the content system may set the initial privacy settings, the user may update the privacy settings, the content system may update the privacy settings, and/or the like. For example, the content system may limit recommendations based on content searches or watched content on a first type of user device (e.g., a personal user device, such as a mobile phone, a tablet computer, a laptop computer, and/or the like) to only the first type of user device. In another example, the content system may limit recommendations based on content searches or watched content on a second type of user device (e.g., a home user device, such as a smart television, a set-top box, and/or the like), during a particular time period (e.g., from 9:00 PM to 5:00 AM), to only the second type of user device and during the particular time period. Thus, the content system may conserve computing resources, networking resources, and/or other resources that would have otherwise been consumed by managing user profiles with user devices, failing to secure privacy of a user with a user profile, being unable to manage a user profile due to non-intuitive mechanisms for managing the user profile, and/or the like.

FIGS. 1A-1I are diagrams of an example 100 associated with protecting privacy associated with utilized content. As shown in FIGS. 1A-1I, example 100 includes different user devices 105 associated with a same account for receiving content from a content system 110. For example, a first user device 105-1 may be a personal user device 105, such as smartphone; a second user device 105-2 may be a home user device 105, such as a set-top box; and a third user device 105-3 may be a home user device 105, such as a tablet computer. Further details of the user devices 105 and the content system 110 are provided elsewhere herein. While only three user devices 105, types, and profiles are shown in FIG. 1A, this is merely representative and there may be a plurality of user devices 105, types, and profiles, greater or less than three.

As shown in FIG. 1A, and by reference number 115, the content system 110 may monitor and/or receive, from the first user device 105-1, a first user device identifier, a first user device type, and first privacy settings limiting content to only the first user device 105-1. For example, a user of the first user device 105-1 may utilize the first user device 105-1 to communicate with the content system 110. The first user device 105-1 may communicate with the content system 110 to access the account for receiving content from the content system 110 and to set up the first user device 105-1 for the account. In some implementations, the first user device 105-1 may provide the first user device identifier, the first user device type, and the first privacy settings to the content system 110 when setting up the first user device 105-1 for the account.

The first user device identifier may include a mobile equipment identifier (MEID), an international mobile subscriber identity (IMSI), a network address (e.g., an Internet protocol (IP) address), and/or the like. The first user device type may include a personal user device, such as a mobile phone (e.g., a smart phone), a tablet computer, a laptop computer, a desktop computer, and/or the like. The first privacy settings may include privacy settings that limit any content, content recommendations, partially viewed content, and/or the like to only the first user device 105-1, such that the second user device 105-2 and the third user device 105-3 may not have access to the content, content recommendations, partially viewed content, and/or the like provided to the first user device 105-1. The user may utilize the first user device 105-1 to input the first privacy settings for the account for receiving content from the content system 110. In some implementations, depending on a user device type, a user may set initial first privacy settings for the first user device 105-1, the content system 110 may set the initial first privacy settings, the user of the first user device 105-1 may update the first privacy settings, the content system 110 may update the first privacy settings, and/or the like.

As further shown in FIG. 1A, and by reference number 120, the content system 110 may monitor and/or receive, from the second user device 105-2, a second user device identifier, a second user device type, and second privacy settings limiting content to only the second user device 105-2 during a particular time period. For example, a user of the second user device 105-2 may utilize the second user device 105-2 to communicate with the content system 110. The second user device 105-2 may communicate with the content system 110 to access the account for receiving content from the content system 110 and to set up the second user device 105-2 for the account. In some implementations, the second user device 105-2 may provide the second user device identifier, the second user device type, and the second privacy settings to the content system 110 when setting up the second user device 105-2 for the account.

The second user device identifier may include an MEID, an IMSI, a network address (e.g., an IP address), a set-top box identification number, and/or the like. The second user device type may include a personal user device or a home user device, such as a mobile phone (e.g., a smart phone), a tablet computer, a laptop computer, a desktop computer, a smart television, a set-top box, a media streaming device, and/or the like. The second privacy settings may include privacy settings that limit any content, content recommendations, partially viewed content, and/or the like to only the second user device 105-1 during the particular time period (e.g., late at night, from 10:00 PM to 5:00 AM, and/or the like), such that the first user device 105-1 and the third user device 105-3 may not have access to the content, content recommendations, partially viewed content, and/or the like provided to the second user device 105-2 during the particular time period. However, the first user device 105-1 and the third user device 105-3 may have access to the content, content recommendations, partially viewed content, and/or the like provided to the second user device 105-2 and outside of the particular time period. The user may utilize the second user device 105-2 to input the second privacy settings for the account for receiving content from the content system 110. In some implementations, depending on a user device type, a user may set initial second privacy settings for the second user device 105-2, the content system 110 may set the initial second privacy settings, the user of the second user device 105-2 may update the first second settings, the content system 110 may update the second privacy settings, and/or the like.

As further shown in FIG. 1A, and by reference number 125, the content system 110 may monitor and/or receive, from the third user device 105-3, a third user device identifier, a third user device type, and third privacy settings not limiting content to only the third user device 105-3. For example, a user of the third user device 105-2 may utilize the third user device 105-3 to communicate with the content system 110. The third user device 105-3 may communicate with the content system 110 to access the account for receiving content from the content system 110 and to set up the third user device 105-3 for the account. In some implementations, the third user device 105-3 may provide the third user device identifier, the third user device type, and the third privacy settings to the content system 110 when setting up the third user device 105-3 for the account.

The third user device identifier may include an MEID, an IMSI, a network address (e.g., an IP address), a set-top box identification number, and/or the like. The third user device type may include a personal user device or a home user device, such as a mobile phone (e.g., a smart phone), a tablet computer, a laptop computer, a desktop computer, a smart television, a set-top box, a media streaming device, and/or the like. The third privacy settings may include privacy settings that do not limit any content, content recommendations, partially viewed content, and/or the like to only the third user device 105-3, such that the first user device 105-1 and the second user device 105-2 may have access to the content, content recommendations, partially viewed content, and/or the like provided to the third user device 105-3. The user may utilize the third user device 105-3 to input the third privacy settings for the account for receiving content from the content system 110. In some implementations, depending on a user device type, a user may set initial third privacy settings for the third user device 105-3, the content system 110 may set the initial third privacy settings, the user of the third user device 105-3 may update the third privacy settings, the content system 110 may update the third privacy settings, and/or the like.

Figure 1B:
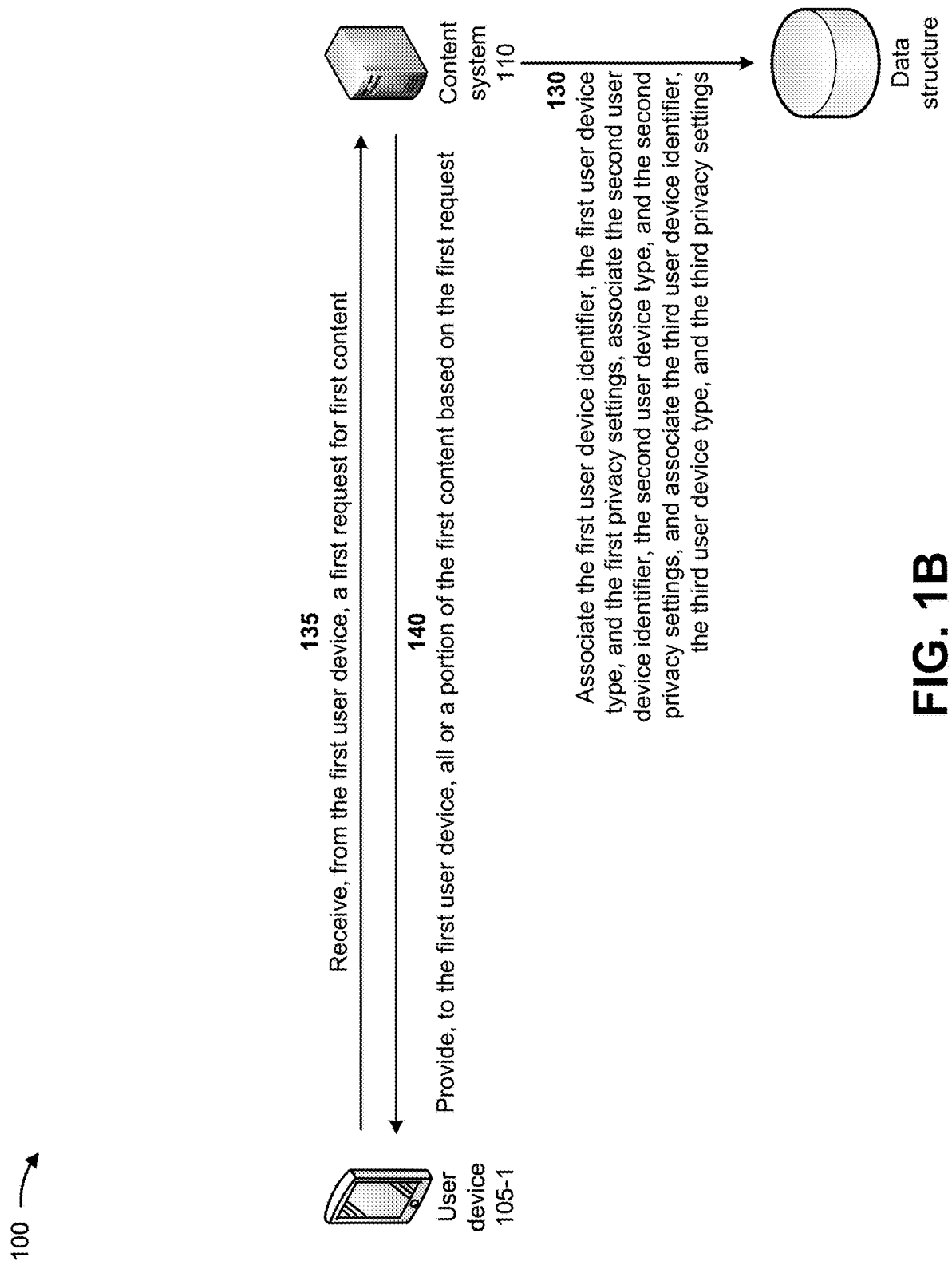

As shown in FIG. 1B, and by reference number 130, the content system 110 may associate and store the first user device identifier, the first user device type, and the first privacy settings in a data structure (e.g., a database, a table, a list, and/or the like); may associate and store the second user device identifier, the second user device type, and the second privacy settings in the data structure; and may associate and store the third user device identifier, the third user device type, and the third privacy settings in the data structure. For example, the content system 110 may maintain the account for the different user devices 105 based on the information received from the user devices 105, as described above in connection with FIG. 1A. In some implementations, the content system 110 may associate the different privacy settings with the different user devices 105 so that each of the different user devices 105 may be customized with different privacy settings. For example, the content system 110 may associate (e.g., map) the first user device identifier, the first user device type, and the first privacy settings, and may store the association, the first user device identifier, the first user device type, and the first privacy settings in the data structure. The content system 110 may associate (e.g., map) the second user device identifier, the second user device type, and the second privacy settings, and may store the association, the second user device identifier, the second user device type, and the second privacy settings in the data structure. The content system 110 may associate (e.g., map) the third user device identifier, the third user device type, and the third privacy settings, and may store the association, the third user device identifier, the third user device type, and the third privacy settings in the data structure.

As further shown in FIG. 1B, and by reference number 135, the content system 110 may receive, from the first user device 105-1, a first request for first content. For example, the user may utilize the first user device 105-1 to browse content offered by the content system 110 and to select the first content (e.g., from a user interface displaying information identifying the first content). When the first user device 105-1 selects the first content, the first user device 105-1 may generate the first request for the first content, and may provide the first request for the first content to the content system 110. The content system 110 may receive the first request for the first content.

As further shown in FIG. 1B, and by reference number 140, the content system 110 may provide, to the first user device 105-1, all or a portion of the first content based on the first request. For example, the content system 110 may receive the first request, and may identify the first content (e.g., in a data structure associated with the content system 110) based on the first request. The content system 110 may determine whether the first user device 105-1 is entitled to receive the first content based on the account associated with the first user device 105-1. If the content system 110 determines that the first user device 105-1 is not entitled to receive the first content, the content system 110 may deny the first request. If the content system 110 determines that the first user device 105-1 is entitled to receive the first content, the content system 110 may provide, to the first user device 105-1, all or a portion of the first content based on the first request. In some implementations, the content system 110 may continuously provide the first content to the first user device 105-1 (e.g., via a download), may periodically provide the first content to the first user device 105-1 (e.g., via streaming), and/or the like.

Figure 1C:
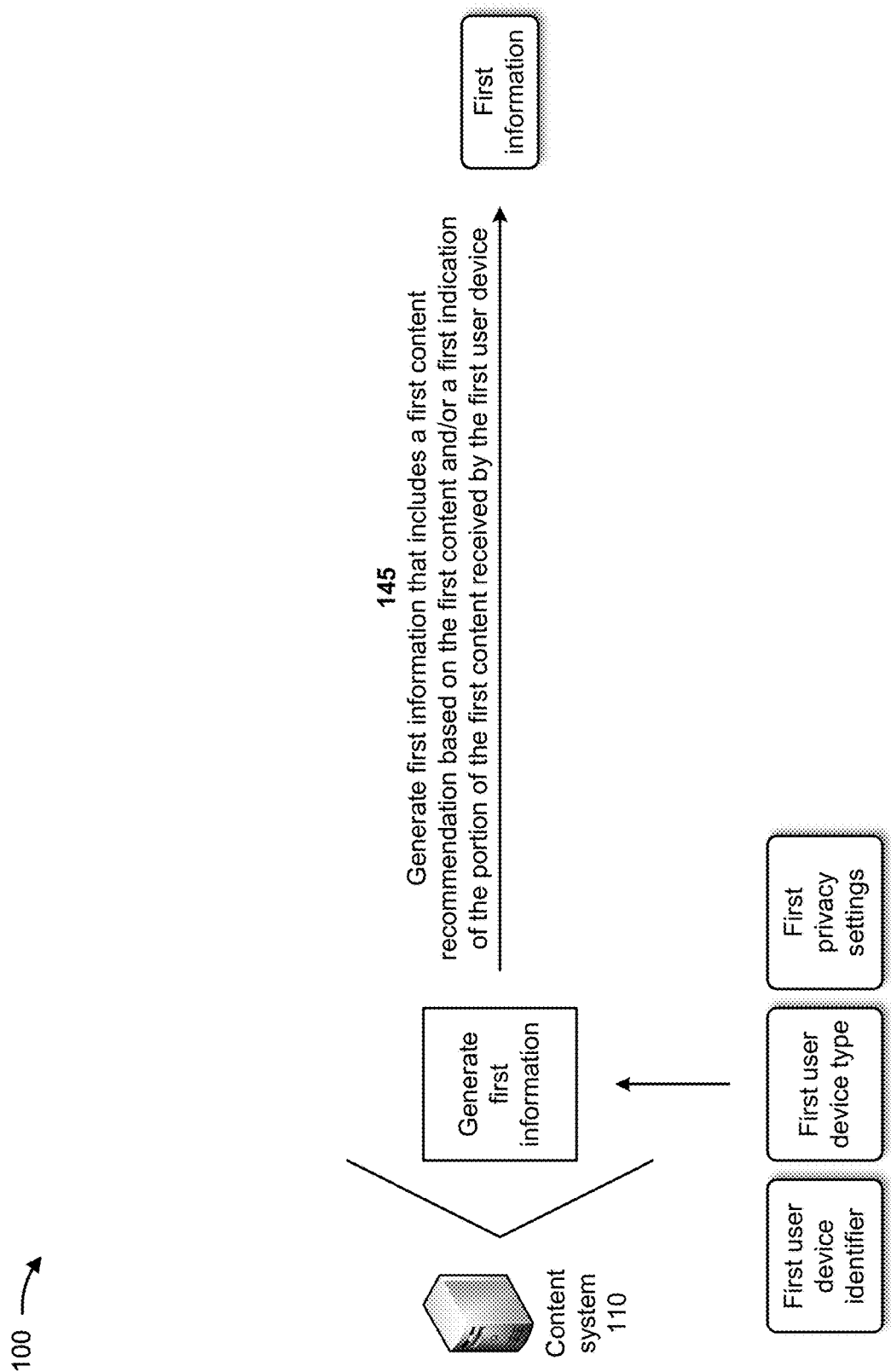

As shown in FIG. 1C, and by reference number 145, the content system 110 may generate first information that includes a first content recommendation based on the first content and/or a first indication of the portion of the first content received by the first user device 105-1. For example, the content system 110 may generate one or more recommendations for the first user device 105-1 based on the first content, content browsed by the first user device 105-1, and/or the like. Since the first content is content to be limited to the first user device 105-1 (e.g., mature content), then such recommendations may also be related to mature content. In some implementations, the content system 110 may generate the first content recommendation based on the first content, the content browsed by the first user device 105-1, and/or the like. The first content recommendation may include a recommendation for content similar to the first content (e.g., an action movie), similar to the content browsed by the first user device 105-1, and/or the like. If the first user device 105-1 did not receive the entire first content (e.g., the user of the first user device 105-1 watched a portion of a movie), the content system 110 may generate the first indication of the portion of the first content received by the first user device 105-1. The first indication may include information requesting whether the user of the first user device 105-1 wishes to receive a remaining portion of the first content (e.g., information requesting whether the user wishes to continue watching a partially viewed movie). In some implementations, the content system 110 may generate the first information that includes the first content recommendation and/or the first indication, and may store the first information in the data structure associated with the content system 110.

Figure 1D:
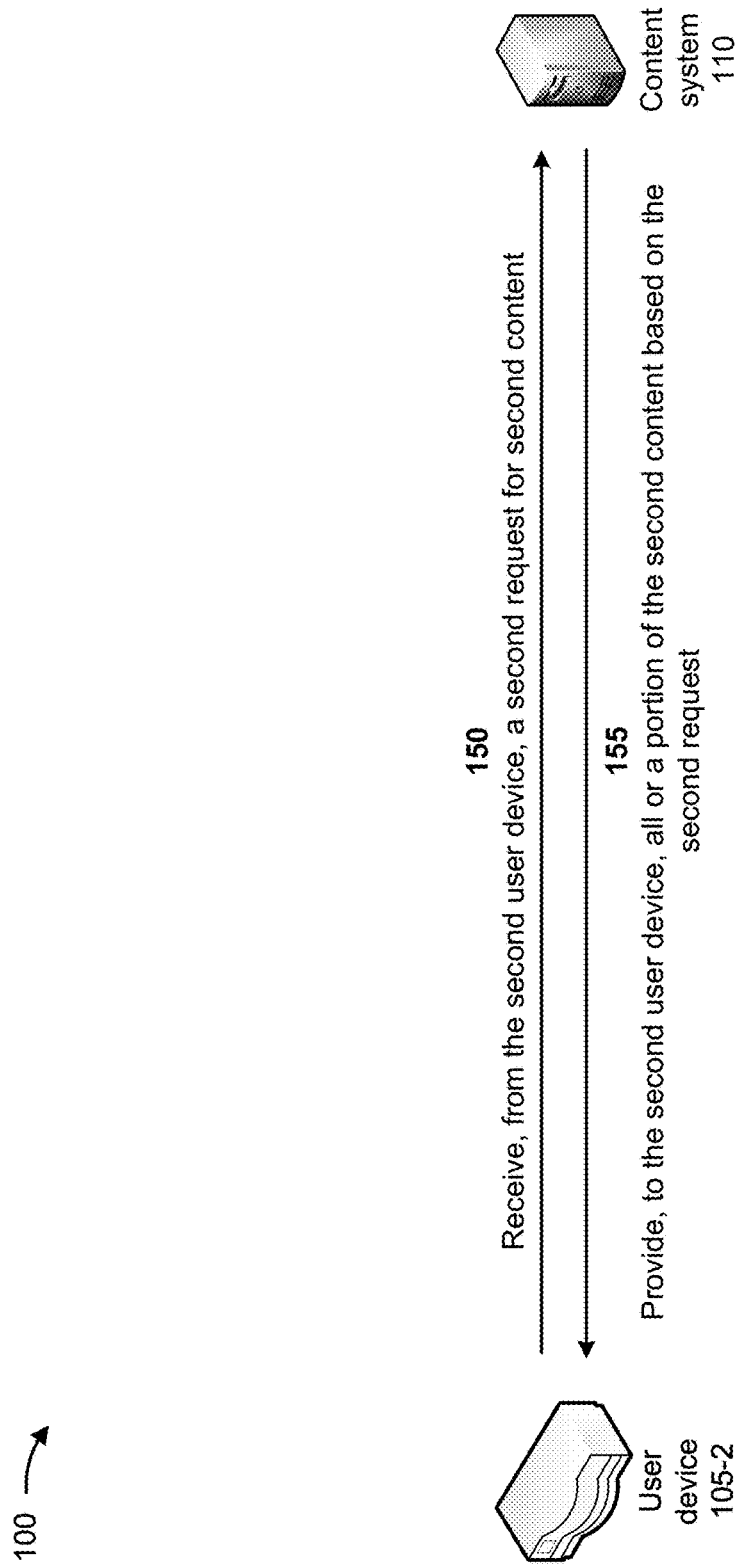

As shown in FIG. 1D, and by reference number 150, the content system 110 may receive, from the second user device 105-2, a second request for second content. For example, the user may utilize the second user device 105-2 to browse content offered by the content system 110 and to select the second content (e.g., from a user interface displaying information identifying the second content). When the second user device 105-2 selects the second content, the second user device 105-2 may generate the second request for the second content, and may provide the second request for the second content to the content system 110. The content system 110 may receive the second request for the second content. In some implementations, the second content may be the same as the first content, different than the first content, and/or the like.

As further shown in FIG. 1D, and by reference number 155, the content system 110 may provide, to the second user device 105-2, all or a portion of the second content based on the second request. For example, the content system 110 may receive the second request, and may identify the second content (e.g., in the data structure associated with the content system 110) based on the second request. The content system 110 may determine whether the second user device 105-2 is entitled to receive the second content based on the account associated with the second user device 105-2. If the content system 110 determines that the second user device 105-2 is not entitled to receive the second content, the content system 110 may deny the second request. If the content system 110 determines that the second user device 105-2 is entitled to receive the second content, the content system 110 may provide, to the second user device 105-2, all or a portion of the second content based on the second request. In some implementations, the content system 110 may continuously provide the second content to the second user device 105-2 (e.g., via a download), may periodically provide the second content to the second user device 105-2 (e.g., via streaming), and/or the like.

Figure 1E:
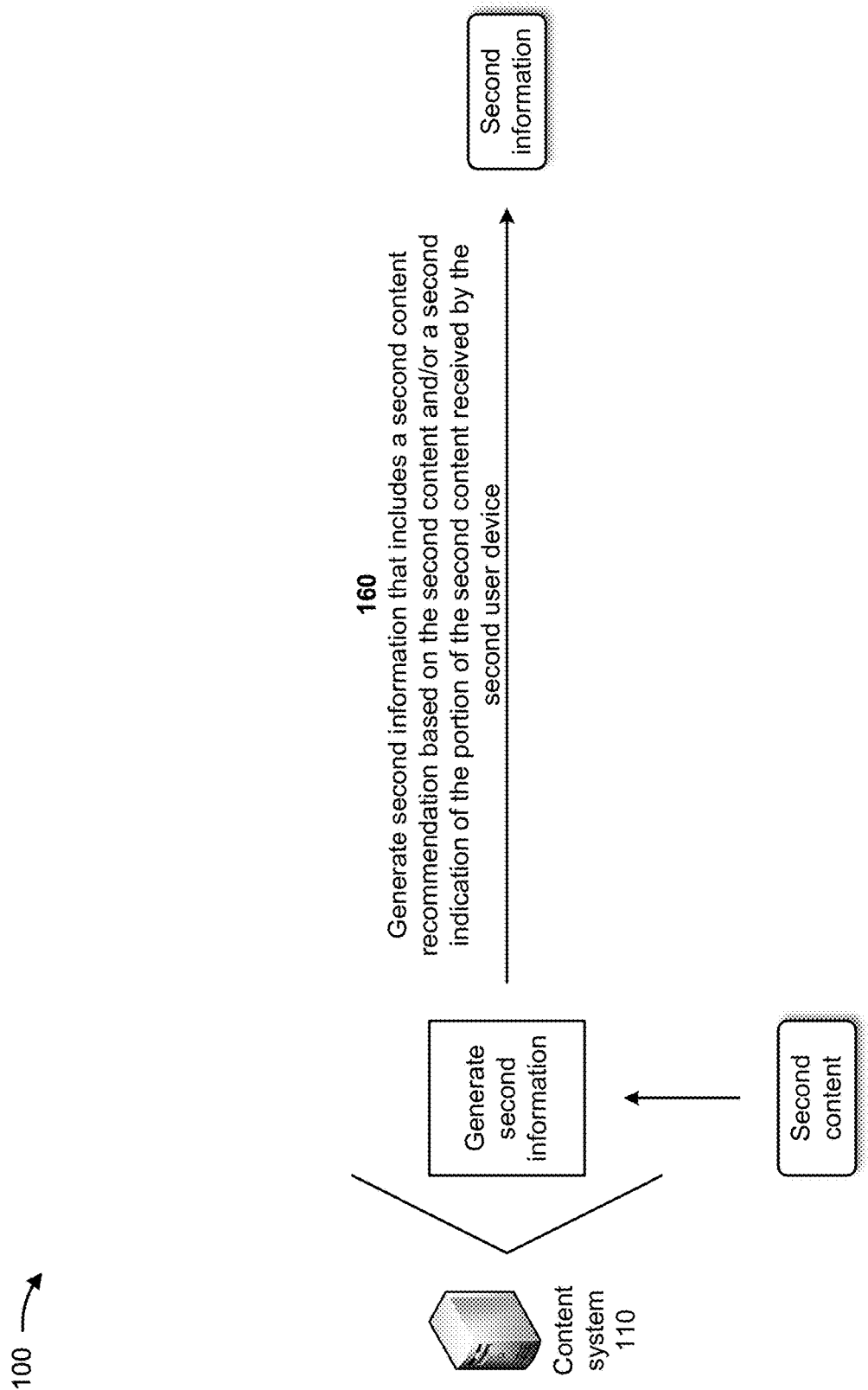

As shown in FIG. 1E, and by reference number 160, the content system 110 may generate second information that includes a second content recommendation based on the second content and/or a second indication of the portion of the second content received by the second user device 105-2. For example, the content system 110 may generate one or more recommendations for the second user device 105-2 based on the second content, content browsed by the second user device 105-2, and/or the like. Since the second content is content to be limited to the second user device 105-2 during a particular time period (e.g., mature content), then such recommendations may also be related to mature content. In some implementations, the content system 110 may generate the second content recommendation based on the second content, the content browsed by the second user device 105-2, and/or the like. The second content recommendation may include a recommendation for content similar to the second content (e.g., a television show), similar to the content browsed by the second user device 105-2, and/or the like. If the second user device 105-2 did not receive the entire second content (e.g., the user of the second user device 105-2 watched a portion of a television show), the content system 110 may generate the second indication of the portion of the second content received by the second user device 105-2. The second indication may include information requesting whether the user of the second user device 105-2 wishes to receive a remaining portion of the second content (e.g., information requesting whether the user wishes to continue watching a partially viewed television show). In some implementations, the content system 110 may generate the second information that includes the second content recommendation and/or the second indication, and may store the second information in the data structure associated with the content system 110.

As shown in FIG. 1F, and by reference number 165, the content system 110 may receive, from the third user device 105-3, a third request for third content. For example, the user may utilize the third user device 105-3 to browse content offered by the content system 110 and to select the third content (e.g., from a user interface displaying information identifying the third content). When the third user device 105-3 selects the third content, the third user device 105-3 may generate the third request for the third content, and may provide the third request for the third content to the content system 110. The content system 110 may receive the third request for the third content. In some implementations, the third content may be the same as the first content and/or the second content, different than the first content and/or the second content, and/or the like.

As further shown in FIG. 1F, and by reference number 170, the content system 110 may provide, to the third user device 105-3, all or a portion of the third content based on the third request. For example, the content system 110 may receive the third request, and may identify the third content (e.g., in the data structure associated with the content system 110) based on the third request. The content system 110 may determine whether the third user device 105-3 is entitled to receive the third content based on the account associated with the third user device 105-3. If the content system 110 determines that the third user device 105-3 is not entitled to receive the third content, the content system 110 may deny the third request. If the content system 110 determines that the third user device 105-3 is entitled to receive the third content, the content system 110 may provide, to the third user device 105-3, all or a portion of the third content based on the third request. In some implementations, the content system 110 may continuously provide the third content to the third user device 105-3 (e.g., via a download), may periodically provide the third content to the third user device 105-3 (e.g., via streaming), and/or the like.

Figure 1G:
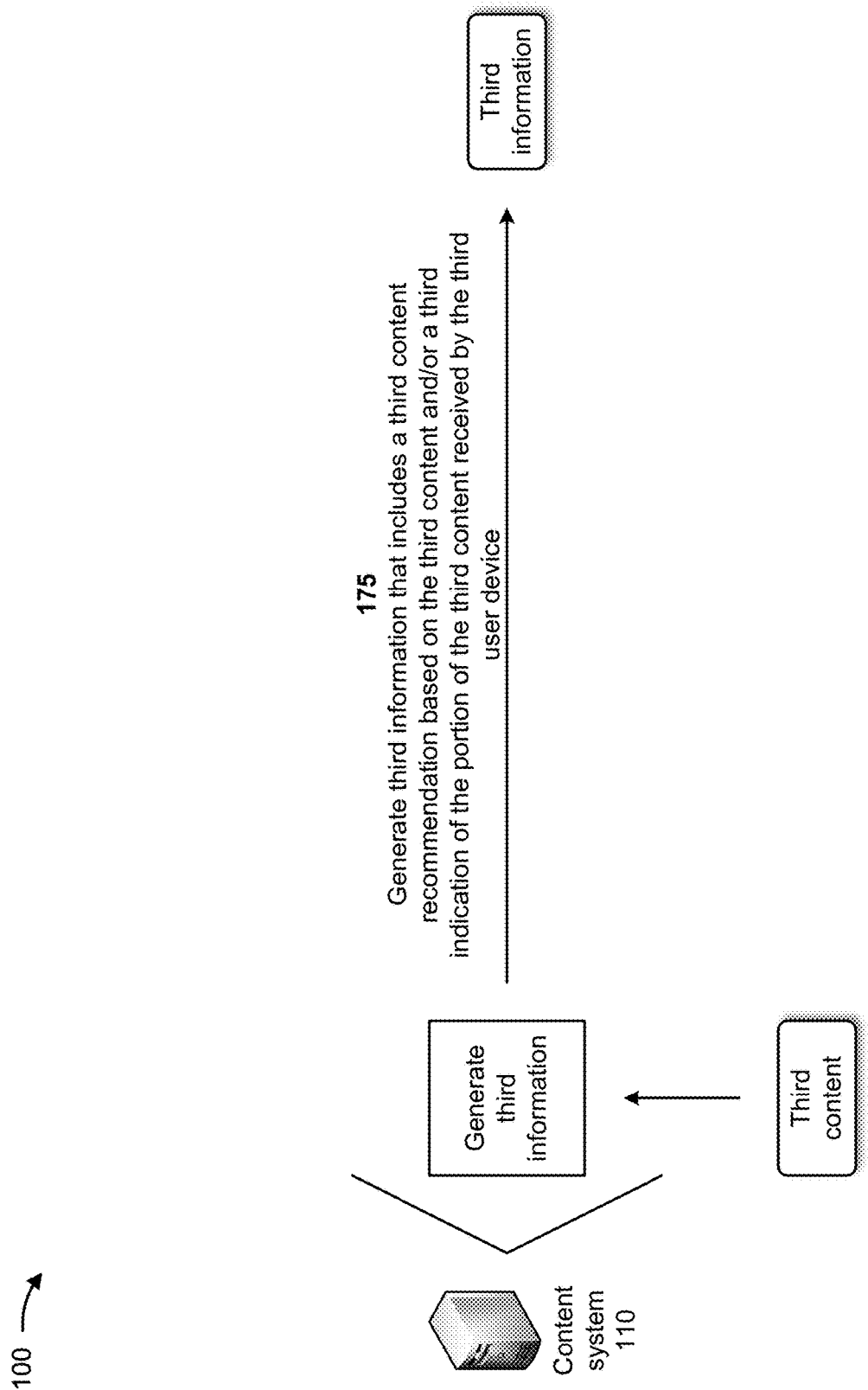

As shown in FIG. 1G, and by reference number 175, the content system 110 may generate third information that includes a third content recommendation based on the third content and/or a third indication of the portion of the third content received by the third user device 105-3. For example, the content system 110 may generate one or more recommendations for the third user device 105-3 based on the third content, content browsed by the third user device 105-3, and/or the like. Since the third content is content that is not limited to any user device 105 (e.g., family content), then such recommendations may also be related to family content. In some implementations, the content system 110 may generate the third content recommendation based on the third content, the content browsed by the third user device 105-3, and/or the like. The third content recommendation may include a recommendation for content similar to the third content (e.g., episodes of a series), similar to the content browsed by the third user device 105-3, and/or the like. If the third user device 105-3 did not receive the entire third content (e.g., the user of the third user device 105-3 watched an episode of the series of episodes), the content system 110 may generate the third indication of the portion of the third content received by the third user device 105-3. The third indication may include information requesting whether the user of the third user device 105-3 wishes to receive a remaining portion of the third content (e.g., information requesting whether the user wishes to continue watching another episode in the series). In some implementations, the content system 110 may generate the third information that includes the third content recommendation and/or the third indication, and may store the third information in the data structure associated with the content system 110.

As shown in FIG. 1H, and by reference number 180, the content system 110 may provide the first information only to the first user device 105-1 based on the first privacy settings, may provide the second information to the first user device 105-1 outside of the particular time period, and may provide the third information to the first user device 105-1. For example, the content system 110 may determine, based on the first privacy settings, that the first information is to be provided to only the first user device 105-1. The content system 110 may identify the first user device 105-1 based on the first user device identifier and the association between the first user device identifier and the first privacy settings. The content system 110 may provide the first information to only the first user device 105-1 based on the first user device identifier and the first privacy settings. The first user device 105-1 may receive the first information and may display the first information to the user of the first user device 105-1.

In some implementations, when providing the first information only to the first user device 105-1 based on the first privacy settings and the first user device identifier, the content system 110 may analyze the first privacy settings, and may determine that the first information is to be provided only to the first user device 105-1 based on analyzing the first privacy settings. The content system 110 may identify the first user device identifier associated with the first user device 105-1, and may provide the first information only to the first user device 105-1 based on identifying the first user device identifier.

In some implementations, the content system 110 may determine, based on the second privacy settings, that the second information may be provided to the first user device 105-1 outside of the particular time period. The content system 110 may prevent the second information from being provided to the first user device 105-1 during the particular time period and based on the second privacy settings. However, the content system 110 may provide the second information to the first user device 105-1 based on the first user device identifier and outside of the particular time period (e.g., based on the second privacy settings). The first user device 105-1 may receive the second information and may display the second information to the user of the first user device 105-1. In some implementations, when providing the second information to the first user device 105-1 outside of the particular time period, the content system 110 may analyze the second privacy settings, and may determine that the second information may be provided to the first user device 105-1, outside of the particular time period, based on analyzing the second privacy settings. The content system 110 may identify the first user device identifier associated with the first user device 105-1, and may provide the second information to the first user device 105-1 outside of the particular time period and based on identifying the first user device identifier.

In some implementations, the content system 110 may determine, based on the third privacy settings, that the third information may be provided to the first user device 105-1. The content system 110 may provide the third information to the first user device 105-1 based on the first user device identifier and the third privacy settings. The first user device 105-1 may receive the third information and may display the third information to the user of the first user device 105-1. In some implementations, when providing the third information to the first user device 105-1, the content system 110 may analyze the third privacy settings, and may determine that the third information may be provided to the first user device 105-1 based on analyzing the third privacy settings. The content system 110 may identify the first user device identifier associated with the first user device 105-1, and may provide the third information to the first user device 105-1 based on identifying the first user device identifier.

As further shown in FIG. 1H, and by reference number 185, the content system 110 may provide the second information only to the second user device 105-2 during the particular time period and based on the second privacy settings, and may provide the third information to the second user device 105-2. For example, the content system 110 may determine, based on the second privacy settings, that the second information is to be provided to only the second user device 105-2 during the particular time period. The content system 110 may identify the second user device 105-2 based on the second user device identifier and the association between the second user device identifier and the second privacy settings. The content system 110 may provide the second information to only the second user device 105-2 during the particular time period and based on the second user device identifier and the second privacy settings. The second user device 105-2 may receive the second information and may display the second information to the user of the second user device 105-2.

In some implementations, when providing the second information only to the second user device 105-2 during the particular time period and based on the second privacy settings, the content system 110 may analyze the second privacy settings, and may determine that the second information is to be provided only to the second user device 105-2 during the particular time period and based on analyzing the first privacy settings. The content system 110 may identify the second user device identifier associated with the second user device 105-2, and may provide the second information only to the second user device 105-2 during the particular time period and based on identifying the second user device identifier.

In some implementations, the content system 110 may determine, based on the third privacy settings, that the third information may be provided to the second user device 105-2. The content system 110 may provide the third information to the second user device 105-2 based on the second user device identifier and the third privacy settings. The second user device 105-2 may receive the third information and may display the third information to the user of the second user device 105-2. In some implementations, when providing the third information to the second user device 105-2, the content system 110 may analyze the third privacy settings, and may determine that the third information may be provided to the second user device 105-2 based on analyzing the third privacy settings. The content system 110 may identify the second user device identifier associated with the second user device 105-2, and may provide the third information to the second user device 105-2 based on identifying the second user device identifier.

As further shown in FIG. 1H, and by reference number 190, the content system 110 may provide the second information to the third user device 105-3 outside of the particular time period, and provide the third information to the third user device 105-3. For example, the content system 110 may determine, based on the second privacy settings, that the second information may be provided to the third user device 105-3 outside of the particular time period. The content system 110 may prevent the second information from being provided to the third user device 105-3 during the particular time period and based on the second privacy settings. However, the content system 110 may provide the second information to the third user device 105-3 based on the third user device identifier and outside of the particular time period (e.g., based on the second privacy settings). The third user device 105-3 may receive the second information and may display the second information to the user of the third user device 105-3. In some implementations, when providing the second information to the third user device 105-3 outside of the particular time period, the content system 110 may analyze the second privacy settings, and may determine that the second information may be provided to the third user device 105-3, outside of the particular time period, based on analyzing the second privacy settings. The content system 110 may identify the third user device identifier associated with the third user device 105-3, and may provide the second information to the third user device 105-3 outside of the particular time period and based on identifying the third user device identifier.

In some implementations, the content system 110 may determine, based on the third privacy settings, that the third information may be provided to the third user device 105-3. The content system 110 may provide the third information to the third user device 105-3 based on the third user device identifier and the third privacy settings. The third user device 105-3 may receive the third information and may display the third information to the user of the third user device 105-3. In some implementations, when providing the third information to the third user device 105-3, the content system 110 may analyze the third privacy settings, and may determine that the third information may be provided to the third user device 105-3 based on analyzing the third privacy settings. The content system 110 may identify the third user device identifier associated with the third user device 105-3, and may provide the third information to the third user device 105-3 based on identifying the third user device identifier.

Figure 1I:
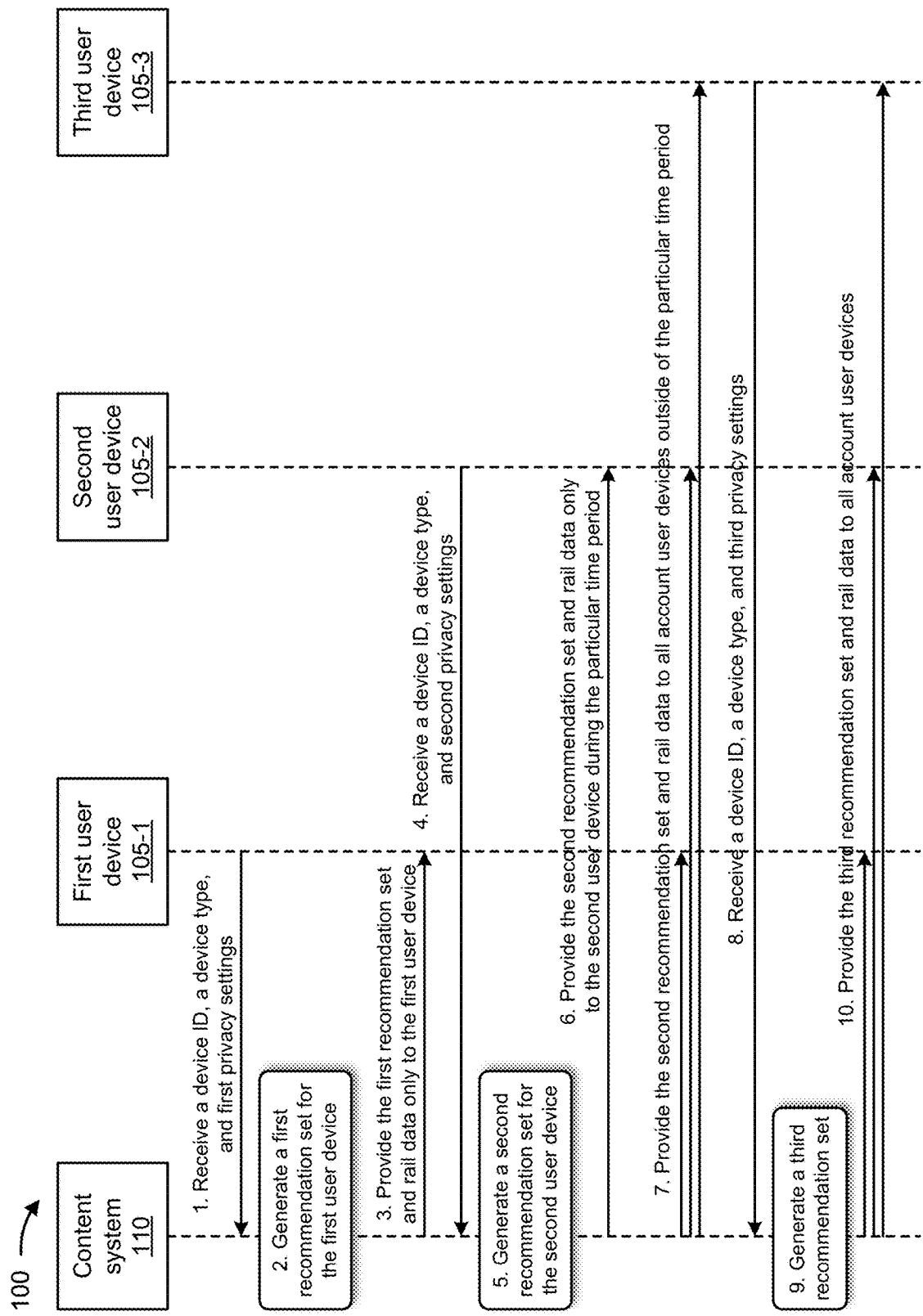

FIG. 1I is an example call flow diagram associated with protecting privacy associated with utilized content. As shown at step 1 of FIG. 1I, the content system 110 may receive a device identifier, a device type, and first privacy settings from the first user device 105-1. As shown at step 2, the content system 110 may generate a first recommendation set for the first user device 105-1 (e.g., based on content received by the first user device 105-1, content browsed by the first user device 105-1, and/or the like). As shown at step 3, the content system 110 may provide the first recommendation set and rail data (e.g., indicating previously viewed content by the first user device 105-1) only to the first user device 105-1.

As shown at step 4 of FIG. 1I, the content system 110 may receive a device identifier, a device type, and second privacy settings from the second user device 105-2. As shown at step 5, the content system 110 may generate a second recommendation set for the second user device 105-2 (e.g., based on content received by the second user device 105-2, content browsed by the second user device 105-2, and/or the like). As shown at step 6, the content system 110 may provide the second recommendation set and rail data (e.g., indicating previously viewed content by the second user device 105-2) only to the second user device 105-2 during the particular time period specified by the second privacy settings. As shown at step 7, the content system 110 may provide the second recommendation set and rail data to all account user devices (e.g., the first user device 105-1, the second user device 105-2, and the third user device 105-3) outside of the particular time period.

As shown at step 8 of FIG. 1I, the content system 110 may receive a device identifier, a device type, and third privacy settings from the third user device 105-3. As shown at step 9, the content system 110 may generate a third recommendation set (e.g., based on content received by the third user device 105-3, content browsed by the third user device 105-3, and/or the like). As shown at step 10, the content system 110 may provide the third recommendation set and rail data (e.g., indicating previously viewed content by the third user device 105-3) to all account user devices (e.g., the first user device 105-1, the second user device 105-2, and the third user device 105-3).

In this way, the content system 110 protects privacy associated with utilized content. For example, the content system 110 may address privacy concerns of users without affecting the ease of content availability, accessibility and overall user experience. The content system 110 may protect privacy associated with utilized content based on a time period of content usage, a user device 105 utilized to consume the content, and a type of content utilized. For example, the content system 110 may limit recommendations based on content searches or watched content on a first type of user device 105 (e.g., a personal user device 105, such as a mobile phone, a tablet computer, a laptop computer, and/or the like) to only the first type of user device 105. In another example, the content system may limit recommendations based on content searches or watched content on a second type of user device 105 (e.g., a home user device 105, such as a smart television, a set-top box, and/or the like), during a particular time period, to only the second type of user device 105 and during the particular time period. Thus, the content system 110 may conserve computing resources, networking resources, and/or other resources that would have otherwise been consumed by managing user profiles with user devices 105, failing to secure privacy of a user with a user profile, being unable to manage a user profile due to non-intuitive mechanisms for managing the user profile, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
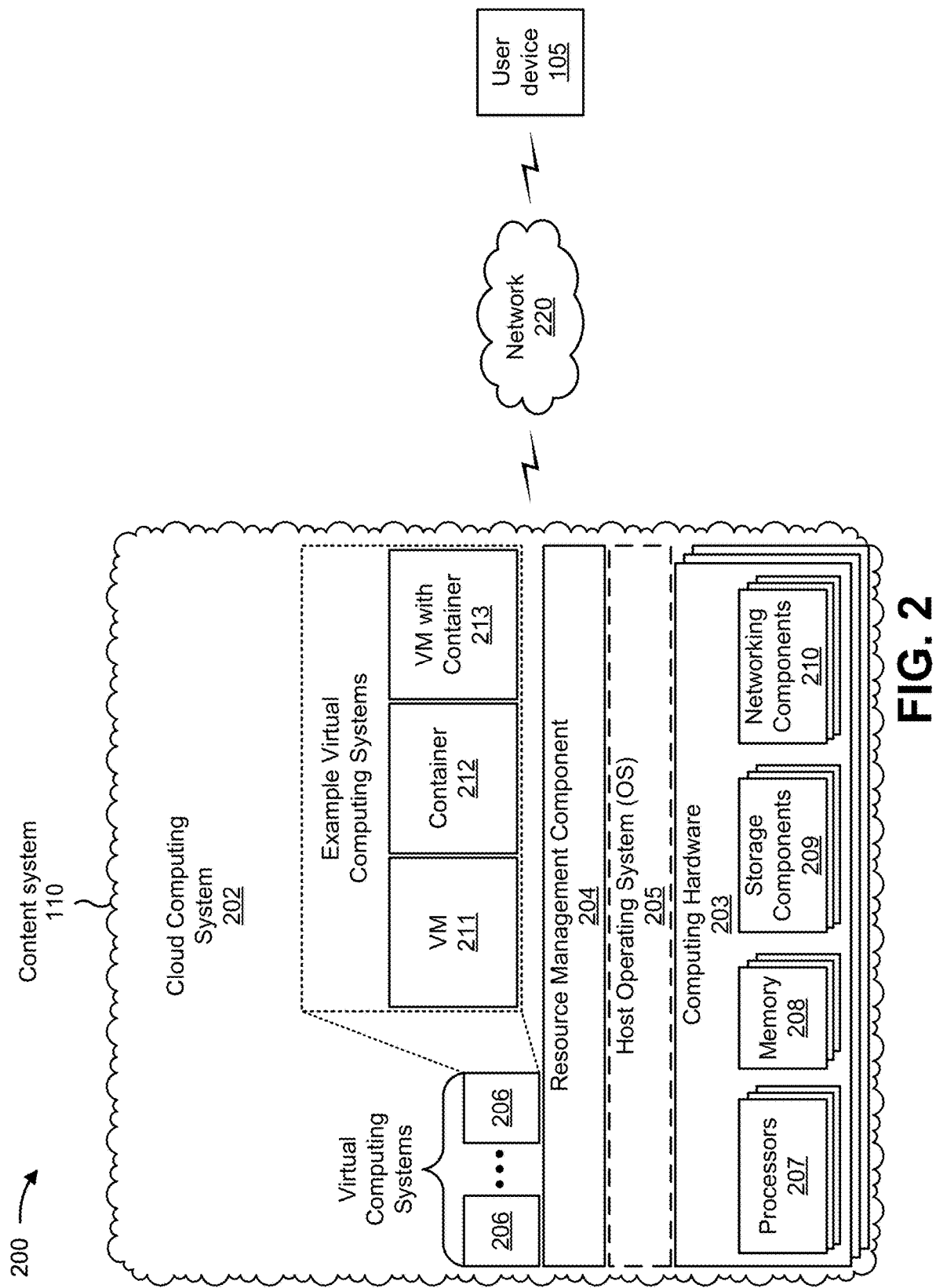
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the content system 110, which may include one or more elements of and/or may execute within a cloud computing system 202. The cloud computing system 202 may include one or more elements 203-213, as described in more detail below. As further shown in FIG. 2, the environment 200 may include the user device 105 and/or a network 220. Devices and/or elements of the environment 200 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the content system 110 may include one or more elements 203-213 of the cloud computing system 202, may execute within the cloud computing system 202, and/or may be hosted within the cloud computing system 202, in some implementations, the content system 110 may not be cloud-based (e.g., may be implemented outside of a cloud computing system) or may be partially cloud-based. For example, the content system 110 may include one or more devices that are not part of the cloud computing system 202, such as the device 300 of FIG. 3, which may include a standalone server or another type of computing device. The content system 110 may perform one or more operations and/or processes described in more detail elsewhere herein.

The network 220 may include one or more wired and/or wireless networks. For example, the network 220 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
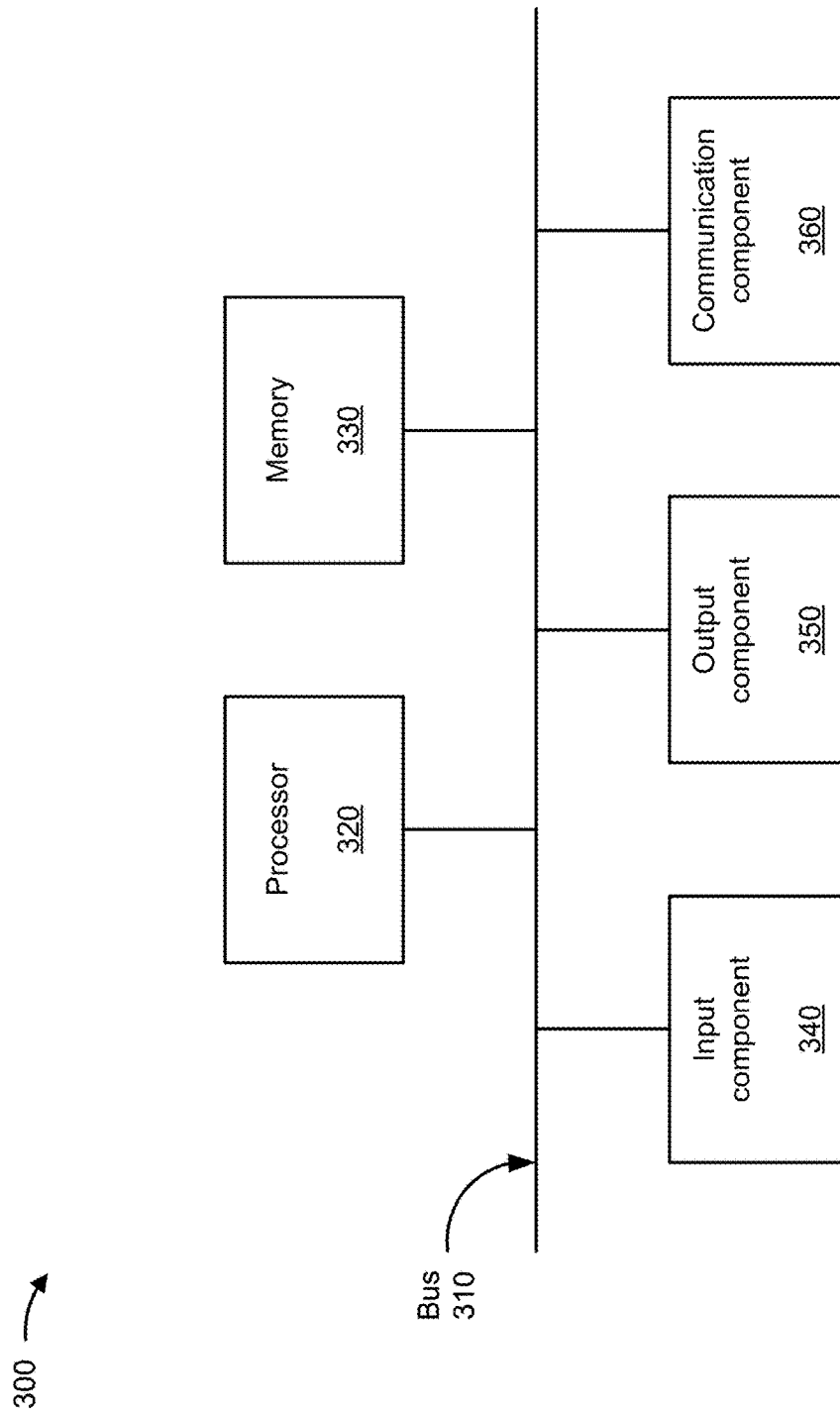
FIG. 3 is a diagram of example components of one or more devices of FIG. 2.

FIG. 3 is a diagram of example components of a device 300, which may correspond to the user device 105 and/or the content system 110. In some implementations, the user device 105 and/or the content system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
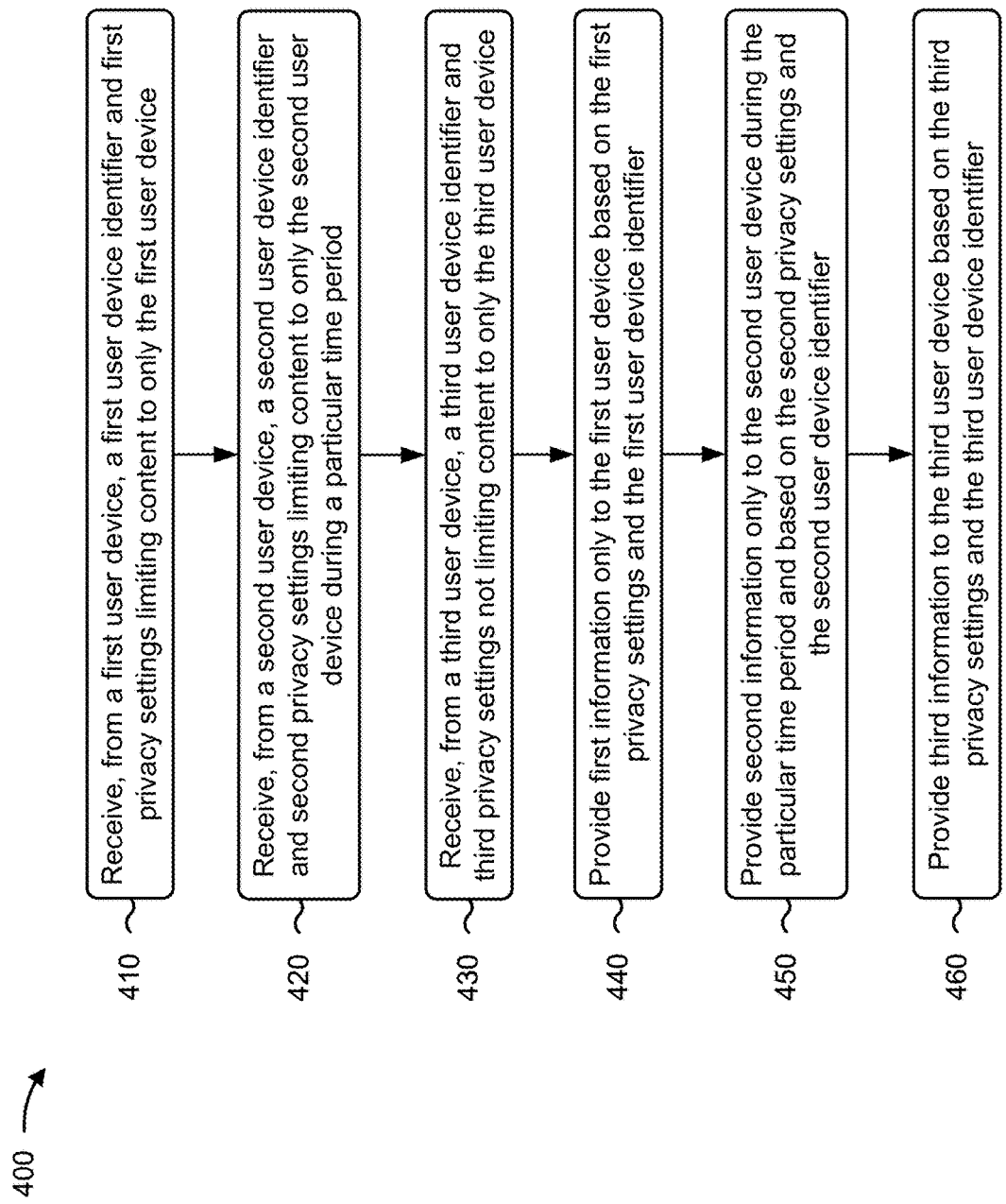
FIG. 4 is a flowchart of an example process for protecting privacy associated with utilized content.

FIG. 4 is a flowchart of an example process 400 for protecting privacy associated with utilized content. In some implementations, one or more process blocks of FIG. 4 may be performed by a device (e.g., the content system 110). In some implementations, one or more process blocks of FIG. 4 may be performed by another device or a group of devices separate from or including the device, such as a user device (e.g., the user device 105). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from a first user device, a first user device identifier and first privacy settings limiting content to only the first user device (block 410). For example, the device may receive, from a first user device, a first user device identifier and first privacy settings limiting content to only the first user device, as described above. In some implementations, the first user device is one of a mobile phone, a tablet computer, a laptop computer, or a desktop computer.

As further shown in FIG. 4, process 400 may include receiving, from a second user device, a second user device identifier and second privacy settings limiting content to only the second user device during a particular time period (block 420). For example, the device may receive, from a second user device, a second user device identifier and second privacy settings limiting content to only the second user device during a particular time period, as described above. In some implementations, the second user device is one of a smart television, a set-top box, or a media streaming device.

As further shown in FIG. 4, process 400 may include receiving, from a third user device, a third user device identifier and third privacy settings not limiting content to only the third user device (block 430). For example, the device may receive, from a third user device, a third user device identifier and third privacy settings not limiting content to only the third user device, as described above. In some implementations, the first user device, the second user device, and the third user device are associated with an account for receiving content from the device.

As further shown in FIG. 4, process 400 may include providing first information only to the first user device based on the first privacy settings and the first user device identifier (block 440). For example, the device may provide first information only to the first user device based on the first privacy settings and the first user device identifier, as described above. In some implementations, providing the first information only to the first user device based on the first privacy settings and the first user device identifier includes analyzing the first privacy settings, determining that the first information is to be provided only to the first user device based on analyzing the first privacy settings, identifying the first user device identifier associated with the first user device, and providing the first information only to the first user device based on identifying the first user device identifier. In some implementations, the first information includes results of content searches performed by the first user device.

As further shown in FIG. 4, process 400 may include providing second information only to the second user device during the particular time period and based on the second privacy settings and the second user device identifier (block 450). For example, the device may provide second information only to the second user device during the particular time period and based on the second privacy settings and the second user device identifier, as described above.

As further shown in FIG. 4, process 400 may include providing third information to the third user device based on the third privacy settings and the third user device identifier (block 460). For example, the device may provide third information to the third user device based on the third privacy settings and the third user device identifier, as described above.

In some implementations, process 400 includes receiving, from the first user device, a first request for first content; providing, to the first user device, all or a portion of the first content based on the first request; and generating the first information that includes a first content recommendation based on the first content and/or a first indication of the portion of the first content received by the first user device.

In some implementations, process 400 includes receiving, from the second user device, a second request for second content; providing, to the second user device, all or a portion of the second content based on the second request; and generating the second information that includes a second content recommendation based on the second content and/or a second indication of the portion of the second content received by the second user device. In some implementations, process 400 includes providing, based on the second privacy settings and the first user device identifier, the second information to the first user device outside of the particular time period, and providing, based on the second privacy settings and the third user device identifier, the second information to the third user device outside of the particular time period.

In some implementations, process 400 includes receiving, from the third user device, a third request for third content; providing, to the third user device, all or a portion of the third content based on the third request; and generating the third information that includes a third content recommendation based on the third content and/or a third indication of the portion of the third content received by the third user device. In some implementations, process 400 includes providing the third information to the first user device based on the third privacy settings and the first user device identifier. In some implementations, process 400 includes providing the third information to the second user device based on the third privacy settings and the second user device identifier.

In some implementations, process 400 includes associating and storing the first user device identifier and the first privacy settings in a data structure, associating and storing the second user device identifier and the second privacy settings in the data structure, and associating and storing the third user device identifier and the third privacy settings in the data structure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device and from a first user device, a first user device identifier and first privacy settings, the first privacy settings preventing a second user device and a third user device from accessing content or content recommendations provided to the first user device;
receiving, by the device and from the second user device, a second user device identifier and second privacy settings, the second privacy settings preventing the first user device and the third user device from accessing content or content recommendations provided, during a particular time period, to the second user device;
receiving, by the device and from the third user device, a third user device identifier and third privacy settings, the third privacy settings enabling the first user device and the second user device to access content or content recommendations provided to the third user device;
providing, by the device, first information only to the first user device based on the first privacy settings and the first user device identifier;
providing, by the device, second information only to the second user device during the particular time period and based on the second privacy settings and the second user device identifier; and
providing, by the device, third information to the third user device based on the third privacy settings and the third user device identifier.

2. The method of claim 1, further comprising:
receiving, from the first user device, a first request for first content;
providing, to the first user device, all or a portion of the first content based on the first request; and
generating the first information that includes a first content recommendation based on the first content and/or a first indication of the portion of the first content received by the first user device.

3. The method of claim 1, further comprising:
receiving, from the second user device, a second request for second content;
providing, to the second user device, all or a portion of the second content based on the second request; and
generating the second information that includes a second content recommendation based on the second content and/or a second indication of the portion of the second content received by the second user device.

4. The method of claim 3, further comprising:
providing, based on the second privacy settings and the first user device identifier, the second information to the first user device outside of the particular time period; and
providing, based on the second privacy settings and the third user device identifier, the second information to the third user device outside of the particular time period.

5. The method of claim 1, further comprising:
receiving, from the third user device, a third request for third content;
providing, to the third user device, all or a portion of the third content based on the third request; and
generating the third information that includes a third content recommendation based on the third content and/or a third indication of the portion of the third content received by the third user device.

6. The method of claim 5, further comprising:
providing the third information to the first user device based on the third privacy settings and the first user device identifier.

7. The method of claim 5, further comprising:
providing the third information to the second user device based on the third privacy settings and the second user device identifier.

8. A device, comprising:
one or more processors configured to:
receive, from a first user device, a first user device identifier and first privacy settings, the first privacy settings preventing a second user device and a third user device from accessing content or content recommendations provided to the first user device;
receive, from the second user device, a second user device identifier and second privacy settings, the second privacy settings preventing the first user device and the third user device from accessing content or content recommendations provided, during a particular time period, to the second user device;
receive, from the third user device, a third user device identifier and third privacy settings, the third privacy settings enabling the first user device and the second user device to access content or content recommendations provided to the third user device;
receive, from the first user device, a first request for first content;
provide, to the first user device, all or a portion of the first content based on the first request;
generate first information that includes a first content recommendation based on the first content and/or a first indication of the portion of the first content received by the first user device;
provide the first information only to the first user device based on the first privacy settings and the first user device identifier;
receive, from the second user device, a second request for second content;
provide, to the second user device and during the particular time period, all or a portion of the second content based on the second request;
generate second information that includes a second content recommendation based on the second content and/or a second indication of the portion of the second content received by the second user device; and
provide the second information only to the second user device based on the second privacy settings and the second user device identifier.

9. The device of claim 8, wherein the one or more processors are further configured to:
associate and store the first user device identifier and the first privacy settings in a data structure;
associate and store the second user device identifier and the second privacy settings in the data structure; and
associate and store the third user device identifier and the third privacy settings in the data structure.

10. The device of claim 8, wherein the first user device, the second user device, and the third user device are associated with an account for receiving content from the device.

11. The device of claim 8, wherein the first information includes results of content searches performed by the first user device.

12. The device of claim 8, wherein the one or more processors are configured to:
analyze the first privacy settings;
determine that the first information is to be provided only to the first user device based on analyzing the first privacy settings;
identify the first user device identifier associated with the first user device; and
provide the first information only to the first user device based on identifying the first user device identifier.

13. The device of claim 8, wherein the first user device is one of:
a mobile phone,
a tablet computer,
a laptop computer, or
a desktop computer.

14. The device of claim 8, wherein the second user device is one of:
a smart television,
a set-top box, or
a media streaming device.

15. A non-transitory computer-readable medium storing a set of instructions, the set of instructions comprising:
one or more instructions that, when executed by one or more processors of a device, cause the device to:
monitor activity of a first user device, a second user device, and a third user device;
determine a first user device identifier and first privacy settings, the first privacy settings preventing the second user device and the third user device from accessing content or content recommendations provided to the first user device;
determine a second user device identifier and second privacy settings, the second privacy settings preventing the first user device and the third user device from accessing content or content recommendations provided, during a particular time period, to the second user device;
determine a third user device identifier and third privacy settings, the third privacy settings enabling the first user device and the second user device to access content or content recommendations provided to the third user device;
receive, from the first user device, a first request for first content;
provide, to the first user device, all or a portion of the first content based on the first request;
generate first information that includes a first content recommendation based on the first content and/or a first indication of the portion of the first content received by the first user device;
provide the first information only to the first user device based on the first privacy settings and the first user device identifier;
receive, from the second user device, a second request for second content;
provide, to the second user device and during the particular time period, all or a portion of the second content based on the second request; and
generate second information that includes a second content recommendation based on the second content and/or a second indication of the portion of the second content received by the second user device.

16. The non-transitory computer-readable medium of claim 15, wherein the one or more instructions further cause the device to:
provide the second information only to the second user device based on the second privacy settings and the second user device identifier.

17. The non-transitory computer-readable medium of claim 15, wherein the one or more instructions further cause the device to:

provide, based on the second privacy settings and the first user device identifier, the second information to the first user device outside of the particular time period; and provide, based on the second privacy settings and the third user device identifier, the second information to the third user device outside of the particular time period.

18. The non-transitory computer-readable medium of claim 17, wherein the one or more instructions further cause the device to:

receive, from the third user device, a third request for third content;

provide, to the third user device, all or a portion of the third content based on the third request;

generate third information that includes a third content recommendation based on the third content and/or a third indication of the portion of the third content received by the third user device; and provide the third information to the third user device based on the third privacy settings and the third user device identifier.

19. The non-transitory computer-readable medium of claim 18, wherein the one or more instructions further cause the device to:

provide the third information to the first user device based on the third privacy settings and the first user device identifier.

20. The non-transitory computer-readable medium of claim 18, wherein the one or more instructions further cause the device to:

provide the third information to the second user device based on the third privacy settings and the second user device identifier.

* * * * *